Patented Feb. 9, 1943

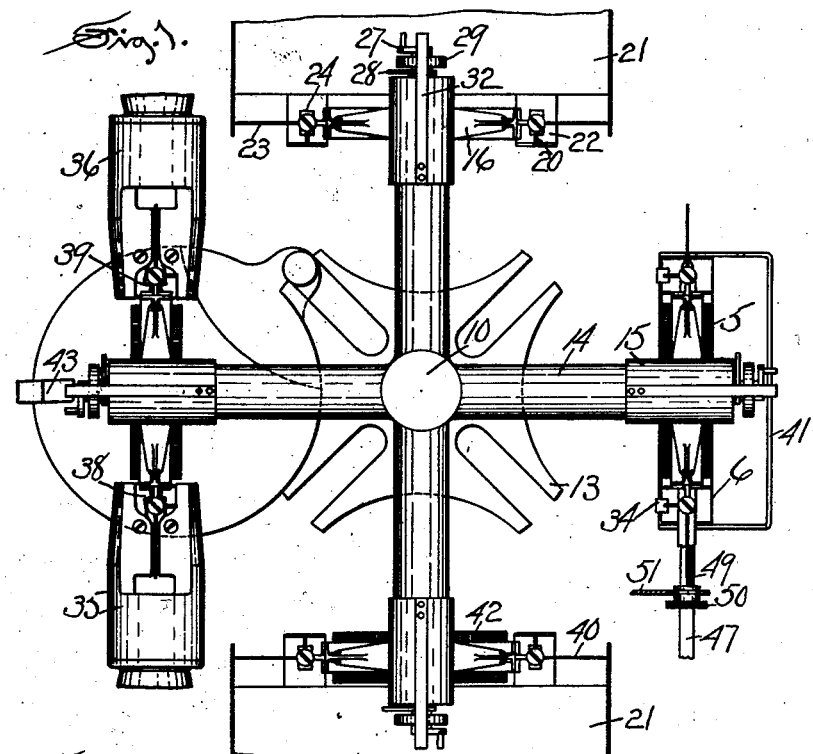
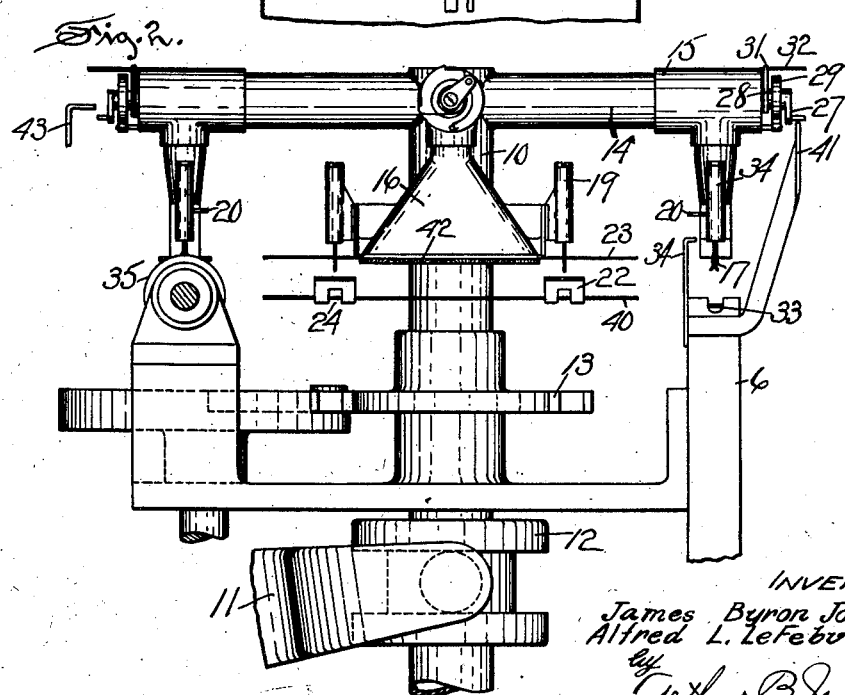

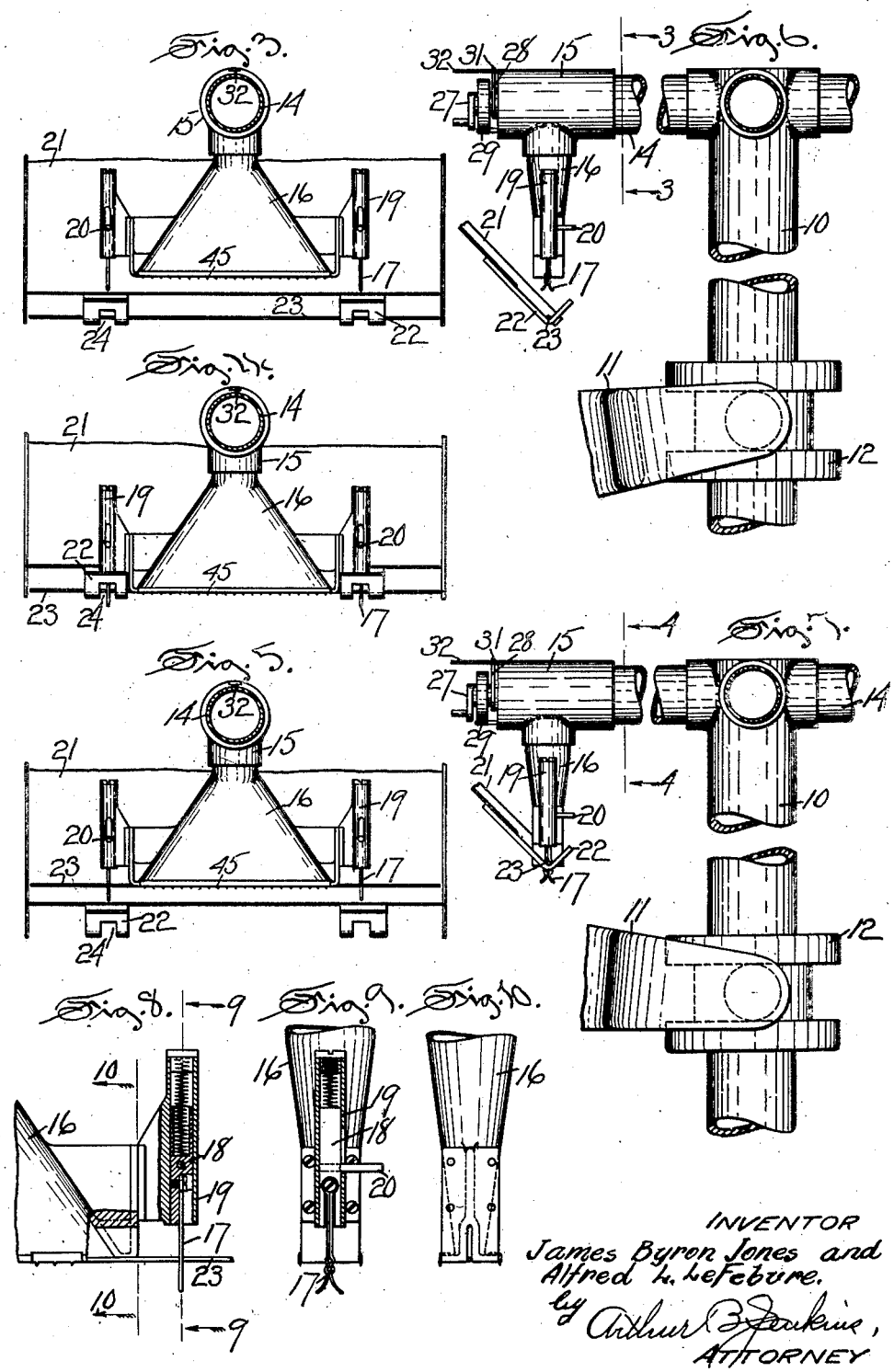

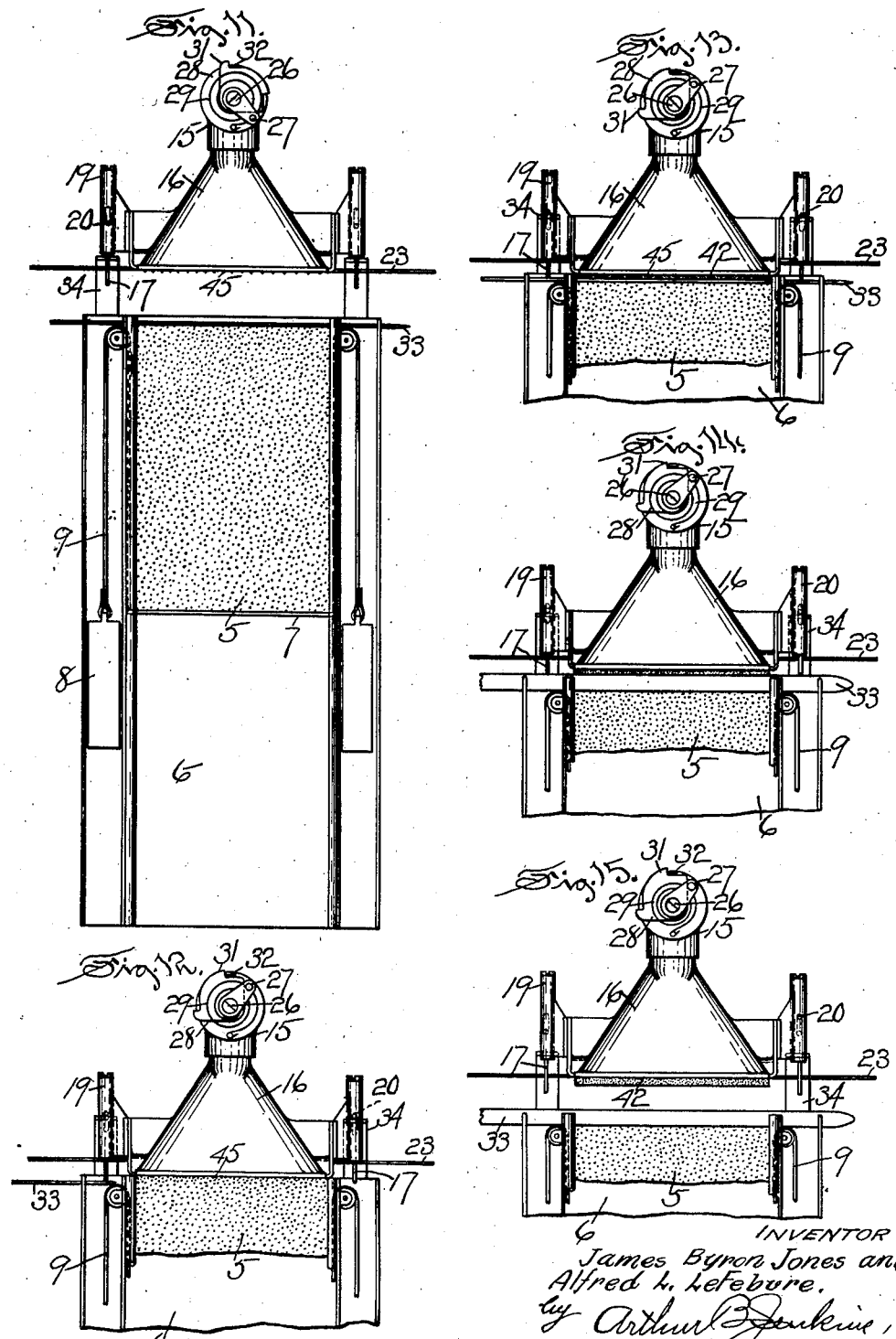

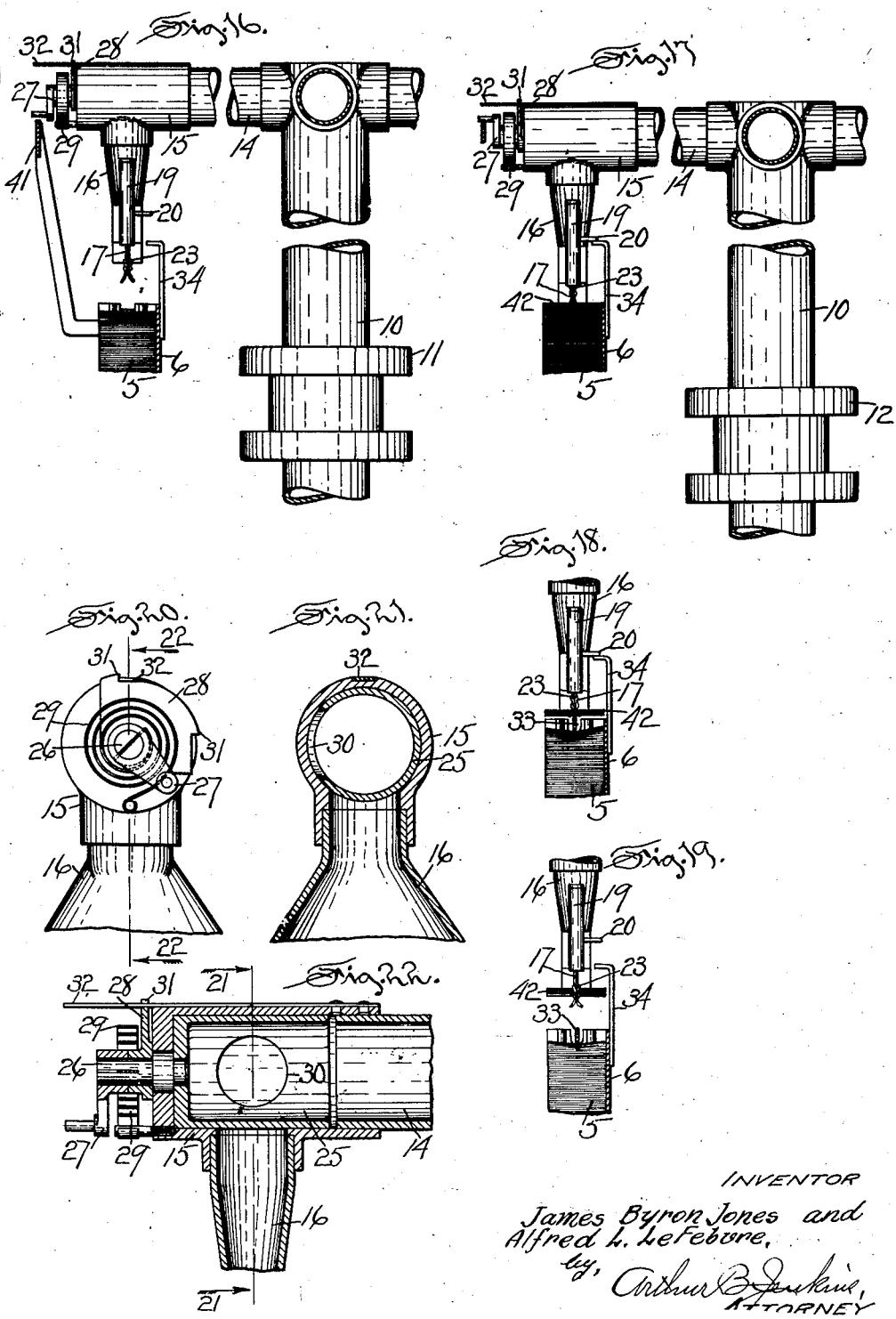

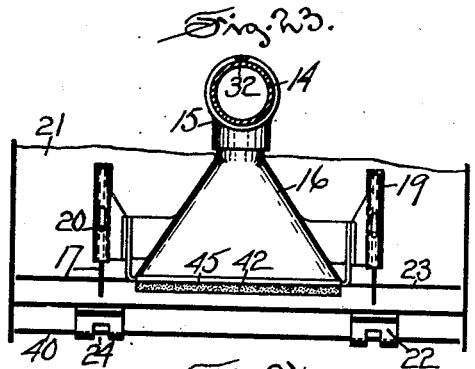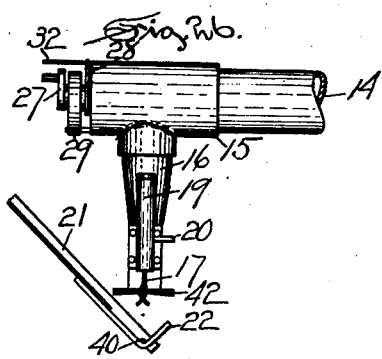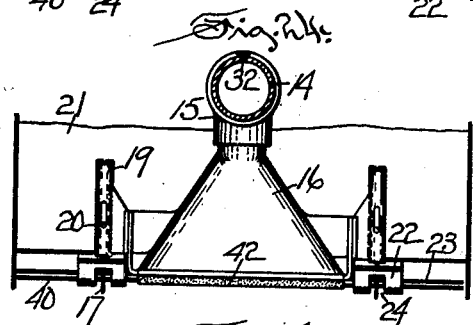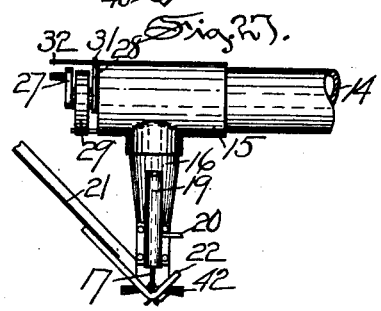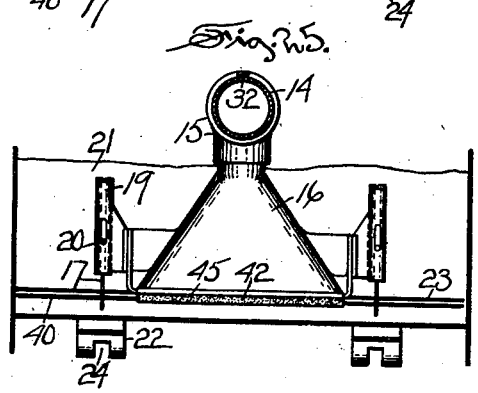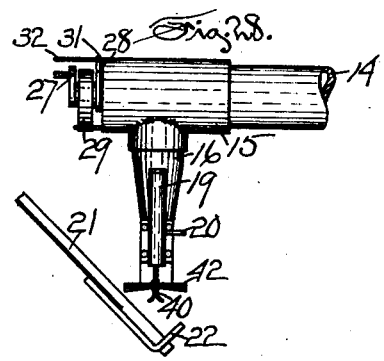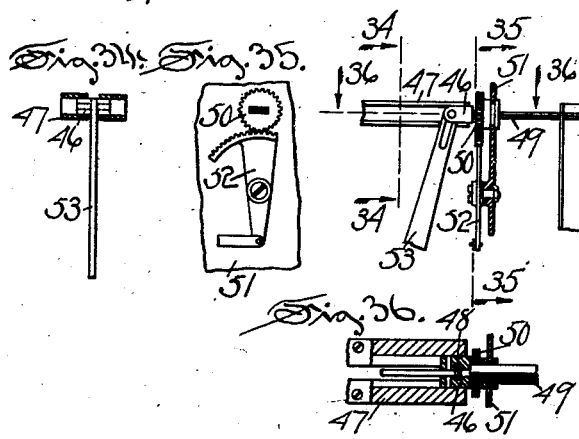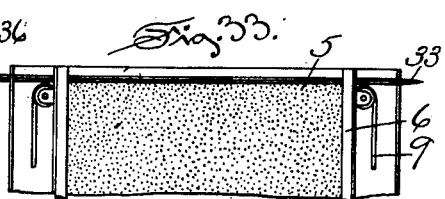

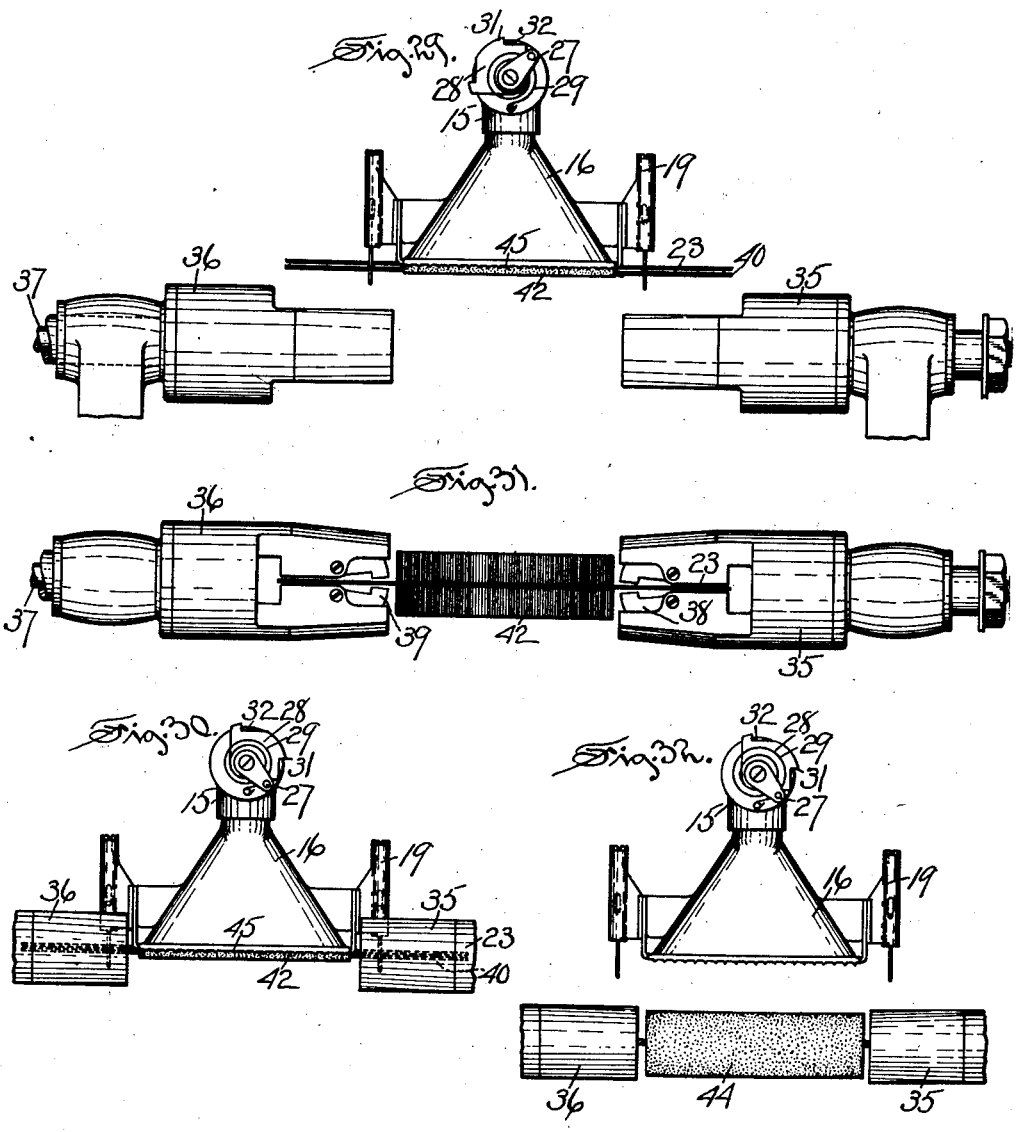

2,310,897

UNITED STATES PATENT OFFICE 2,310,897

PROCESS FOR BRUSH MAKING

James Byron Jones, West Hartford, and Alfred L. Le Febvre, Hartford, Conn., assignor to The Fuller Brush Company, Hartford, Conn., a corporation of Connecticut Application April 29, 1939, Serial No. 270,946

13 Claims. (Cl. 300—21)

Our invention relates in one of its aspects to brush manufacture, and an object of the invention, among others, is the arrangement of brush material, as fibers and the like, in layers of definite thicknesses and especially to provide for the separation of such layers from a mass of the material, which layers may be subsequently used in several different ways, as in the manufacture of brushes, or otherwise; and a further object of the invention is a process for separation of such layers from a mass thereof in a most efficient manner.

One method of carrying out our improved process and in the practice and use of which the objects herein set out, as well as others, may be attained, is illustrated in the accompanying drawings, in which—

Figure 1 is a diagrammatic view illustrating a manner of utilizing the process, a plan view of the apparatus being shown.

Figure 2 is a view in elevation of said apparatus.

Figure 3 is a view illustrating means for assembling the wire and brush material in a preliminary step in the process and in section on dotted line 3—3 of Fig. 6.

Fig. 4 is a view illustrating an advanced position of the parts shown in Fig. 3 and in section on a plane denoted by the dotted line 4—4 of Fig. 7.

Figure 5 is a view similar to Figures 3 and 4 but illustrating a further advanced step in the process.

Figure 6 is a view on enlarged scale showing the manner of raising and lowering the fiber and wire collector which is shown in Figs. 3 to 5.

Figure 7 is a view similar to Fig. 6 but illustrating an advanced position of the fiber and wire collector.

Figure 8 is a view in section through part of the fiber and wire collector, and particularly the latter.

Figure 9 is a view in section on a plane denoted by the dotted line 9—9 of Fig. 8.

Figure 10 is a view in section on a plane denoted by the dotted line 10—10 of Fig. 8.

Figure 11 is a view of the wire and fiber collector shown in Figs. 3 to 5, but looking in the opposite direction and illustrating its operation in connection with a supply of fiber.

Figures 12, 13, 14 and 15 are views similar to Figure 11, showing the upper part of the apparatus contained in that figure and illustrating successive steps in the process of collecting a layer of fiber from the mass within the hopper.

Figure 16 is a view in side elevation of a portion of the apparatus as seen in Fig. 11, looking from the right.

Figure 17 is a similar view of the apparatus as shown in Fig. 13.

Figure 18 is a view in side elevation of a portion of the apparatus shown in Fig. 14, looking from the right.

Fig. 19 is a similar view with respect to Fig. 15.

Figure 20 is a view in elevation on enlarged scale illustrating the valve mechanism.

Figure 21 is a view in section on a plane denoted by the dotted line 21—21 of Fig. 22.

Figure 22 is a similar view on a plane denoted by the dotted line 22—22 of Fig. 20.

Figures 23, 24 and 25 are views in elevation of a portion of the apparatus illustrating different steps in picking up a second wire at the third station.

Figures 26, 27 and 28 are views looking from the left of Figs. 23, 24 and 25 respectively.

Figure 29 is a view in elevation of a portion of the apparatus showing the collector positioned at the fourth or final station.

Figure 30 is a view illustrating an advanced step in the operation of the parts at this station.

Figure 31 is a top view with the collector hood removed.

Figure 32 is a view in elevation showing the final step in the process.

Figure 33 is a view in elevation illustrating means for operating the dagger.

Figure 34 is a view in section on a plane denoted by the dotted line 34—34 of Fig. 33.

Figure 35 is a similar view on a plane denoted by the dotted line 35—35 of Fig. 33.

Figure 36 is another similar view but on enlarged scale on a plane denoted by the dotted line 36—36 of Fig. 33.

Our invention is peculiarly adapted for use in arranging various sorts of material in the nature of hair, bristles or other fibers in predetermined forms or masses for subsequent manipulation, as in the manufacture of brushes, to which art it is readily adapted and for which reason we have selected such for the purpose of disclosure of our invention herein without any intention, however, of limiting the invention to such manufacture.

In the construction of various kinds of brushes it is a common practice as a matter of convenience to have the bristles, hair, or other fibrous material arranged in thin layers of proper length and width and this is frequently done by the laborious process of manually spreading and arranging them and this not only involves much time but also much skill in getting uniformity in the thickness of the layers to satisfy requirements. It will be understood that the invention relates to the manipulation of any fibrous material, but as a matter of convenience the term "bristles" will be hereinafter used as describing all of the various kinds of material. By the use of our improved invention herein illustrated and described we are enabled to produce layers of material in a rapid and efficient manner and of an evenness as to thickness to satisfy the most rigid requirements, a machine for practicing the process being shown in the drawings herein illustrating a mass of bristles 5 deposited in a magazine 6 from which it is collected and removed as required. This magazine may be of any suitable form and size to suit particular conditions, its main essential being a mouth or opening at which the material is presented and from which it may be removed. In the structure herein shown as an illustration a floor or bottom 7 is mounted for vertical movement as by means of weights 8 suspended by cords 9 extending over sheaves to the floor to which the cords are attached as shown in Fig. 11. This effects the presence of a continuous supply of the material 5 at the mouth of the magazine, but emission thereof is regulated and controlled by a separator in the form of a dagger which is mounted for reciprocating movement across the mouth of the magazine. We have confined a showing of the means for operating the dagger herein to a more or less diagrammatic arrangement, as many different ways for doing this may be employed and the exact manner of operation is immaterial.

In the drawings herein we have illustrated somewhat diagrammatically, but more or less in detail, a manner and means for carrying out our improved process in connection with the manufacture of brushes by the twisting of thin layers of bristles or other brush material between wires in a manner well known to the art. To do this we employ collectors which operate as units to collect wires and bristles from different places and assemble them in proper order for a final operation, such as twisting the wires. These collectors are movable preferably in a circular path and are carried by a rotatably mounted support in the form of a standpipe 10 mounted in suitable bearings, not shown, and provided with means as a forked lever 11 and grooved collar 12 for imparting vertical reciprocating movement thereto. The standpipe 10 is also provided with means for giving it a step-by-step rotary movement, one member 13 only of a Geneva movement being shown herein in Fig. 1 for this purpose. Supporting arms 14 project radially from the standpipe 10, four of these arms being shown as satisfactorily answering the purpose for illustration and each of these arms supports a collector unit hereinbefore referred to.

One of these units only will be described herein as such description will apply equally to all of them. A supporting head 15 for each collector unit is secured at the end of one of the arms 14 and a collector head in the form of a suction nozzle 16 is secured to and projects downwardly from said head, the arms 14 comprising tubes communicating with the standpipe 10 and the nozzle 16 opening into the tubes. A pair of spring fingers 17 extend downwardly from spring pressed plungers 18 and project from the lower open end of a finger supporting tube 19, there being one of these tubes with its contained parts on each side of each of the nozzles 16. A lifting pin 20 projecting from each of the plungers 18 through a slot in the tube 19 operates to lift the plungers in a manner to be hereinafter described.

As hereinbefore mentioned the collector has a step-by-step or intermittent rotary movement and this simultaneously moves the collector units from one station to another. The first station shown at the top of Fig. 1 has a hopper 21 from the lower end of which wire rests 22 project for the support of wires 23. Each rest has an opening 24 through which the fingers 17 will project in the operation of the machine. It will be understood that a partial vacuum is constantly maintained in the standpipe and arms 14, and the supporting head 15 contains a valve 25 (see Fig. 22) for controlling the constant vacuum in the nozzle 16. A stem 26 of the valve projects through the head 15 and has a valve actuator 27 in the form of a crank and a valve retainer 28 secured thereto as shown in Fig. 22. A spring 29 biases the valve in a direction to close it, that is, to shift the opening 30 in the valve out of registry with the opening in the nozzle 16. The retainer 28 has two teeth 31 adapted to engage a spring detent 32 as shown in Figs. 20 and 22 to retain the valve either in its open or closed position. A separator in the form of a dagger 33 is supported for longitudinal reciprocating movement across the mouth of the magazine 6 as shown in Figs. 11 to 15, and it is also rotatable on a longitudinal axis through an arc of substantially ninety degrees as from the positions shown in Figs. 11 to 13 to the positions shown in Figs. 14 and 15. The means for imparting this movement to the dagger may be of any well-known type, a detailed showing and description not being necessary herein. The magazine also has lifters 34 positioned to engage the lifting pins 20 to lift the fingers 17 at proper times, as hereinbefore described.

The magazine located at the third station shown at the bottom of Fig. 1 is substantially the same as that at station No. 1 and operates in substantially the same manner to apply a second wire to the fingers 17, it having been noticed that these fingers have two sets of wire receiving notches located close together, but one above the other, the first wire being received in the upper set of notches and the second wire being received in the lower set of notches. A further description of this second wire supplying mechanism will therefore be omitted herein, but the same reference characters to denote like parts are applied to the drawings. At this third station a second wire is taken up underneath the mass of fibers whereas at the first station the first wire was taken up alone.

At the fourth station, shown at the left in Fig. 1, the mass accumulated by the collector is disposed of by releasing it from the collector and delivering it to a mechanism for performing further operations upon it. As a satisfactory means for doing this we have shown a portion of a wire twisting device comprising a stationary chuck 35 and a rotatably mounted chuck 36, the latter of which may be rotated as by means of power applied to the spindle 37. Pairs 38 and 39 of chuck jaws of any suitable form common to wire twisting machines comprise a portion of each of the chucks as shown in Fig. 31. A further and more detailed description of this twisting mechanism is omitted herein as it is not material to the invention and will be readily understood by those skilled in the art. The steps of the process are carried out in the following manner reference being had to the figures of the drawings substantially in numerical order. Starting with Fig. 3 the collector unit shown herein is at station No. 1, shown at the top in Fig. 1, with the unit in a raised position. At this instant the lever 11 operates to lower the collector as a whole, and this unit in particular, moving the parts to the position shown in Fig. 4 in which the fingers 17 are forced into engagement with a wire 23 which passes between the members of each pair of fingers as shown in Fig. 7. The lever 11 now operates to lift the collector and this particular unit to the position shown in Fig. 5 with all of the parts clear for movement to station No. 2, shown at the right in Fig. 1, this movement now being effected by operation of the Geneva member 13 and the unit being located at the magazine 6 to receive a supply of bristles. The entire collector being now again lowered by operation of the lever 11 the unit being considered is moved downwardly from the position shown in Fig. 11 to the position shown in Fig. 12. In this downward movement of the unit the pin or crank on the valve actuator 27, being now located over a valve opener 41 projecting upwardly and outwardly from the magazine as shown in Fig. 2, is moved against the opener and the valve is forced against the resistance of its spring into an open position as shown in Fig. 12. In this same movement of the collector unit the lifting pins 20 striking the lifters 34 the fingers 17 are raised to the positions shown in Figs. 12 and 13.

Up to the time of location of the unit over the mouth of the magazine just described it will have been noticed that the bristles in the magazine have been held from outward movement by the dagger 33. The nozzle in its lower position will now control movement of the bristles and the dagger having been withdrawn by its suitably operating mechanism to the position shown in Fig. 12 the bristles are raised against the bottom surface of the nozzle which has a narrow slot sufficient to cause the partial vacuum in the nozzle, assisted by the force of the weights 8, to effect this result. With the parts in this position, as shown in Fig. 12, the dagger operated by its mechanism is forced through the mass of bristles to the position shown in Fig. 13 and a thin slice or layer 42 of bristles is separated from the main mass. This separation will be found effectual with some kinds of fibers while with others there is a distinct tendency for the individual fibers to hang or cling together and to avoid such contingency the dagger is provided with means for turning it to an angle of about ninety degrees to the position shown in Fig. 14 in which operation the entire layer will be effectually separated from the main mass, all of the fibers or bristles being separated one from another.

The collector now being again raised the partial vacum in the nozzle will retain the separated layer in place against the mouth of the nozzle while the geneva operates to move the unit to the third station, shown at the bottom of Fig. 1, and the dagger operating mechanism may now turn the dagger to the flat position shown in Fig. 11.

At station No. 3, as the unit is lowered in the manner as hereinbefore described, a second wire is picked up by the fingers 17 in the same manner as at station No. 1, except that the wire now picked up is against the under surface of the layer 42 of material and on the opposite side thereof from the wire first picked up. This operation of collecting the second wire, in view of the preceding description relating to the picking up of the first wire, will now be found graphically illustrated in the views of Figs. 23 to 28 and a further and detailed description thereof is not thought to be necessary herein.

After the second wire has been collected at the third station and the valve 25 having been continued in its open position the geneva operates to rotate the collector to the fourth and last station, shown at the left in Fig. 1, with the ends of the wires located over the openings between the jaws 38 and 39 of the chucks 35 and 36. From this position the lever 11 will operate to lower the unit from the position shown in Fig. 29 to the position of Fig. 30. During this movement of the unit, and when it has nearly completed its downward movement the spring detent 32, making contact with a trip 43, will be raised and will thereby be disengaged from the tooth 31 by which the valve has been held continuously open since the opening movement at station No. 2 hereinbefore described. The spring 29 will thereby promptly close the valve and thereby release the collected mass of wires and slice 42 of material as shown in Fig. 30, and the lever 11 now operating to raise the unit to the position of Fig. 32, the jaws 35 and 36 may be operated to twist said wires and produce the cylindrical brush structure 44 as shown in Fig. 32.

In order to avoid any creeping action of the fibers with the dagger as the latter is forced through the mass of material 5 to produce a slice 42 the bottom edge of the nozzle 16 may be roughened to a slight degree as shown in Fig. 11 and in other figures of the drawings, this roughened edge being denoted by the numeral 45.

As shown in Figs. 33 to 36 a means for operating the dagger, this including a holder 46, is slidably mounted in a guide 47 and having a recess for the reception of a head 48 on the end of the shank 49 of the dagger, as shown in Fig. 36. This permits turning movement of the dagger within the holder as by means of a pinion 50 rotatably mounted in the frame 51 of the machine. The pinion 50 is rotated by means of a rack on the end of a lever 52 the teeth of which mesh with the teeth on the pinion. The shank 49 of the dagger is non-circular in cross section and passes through a hole of similar shape in the pinion 50 so that turning movement of the pinion is imparted to the dagger and at the same time the dagger may have lengthwise movement through said pinion. A pivotally mounted lever 53 is engaged by a pin and slot connection with the holder 46 for imparting lengthwise movement to the dagger, the end of the lever traversing a slot in the guide 47 in a manner that will be readily understood. The members just described will be timed in their movements to thrust the dagger through the mass of fibers and to turn it at proper intervals, such means not being shown herein as they are not necessary to an understanding of the invention forming the subject matter of this case.

As hereinbefore explained it is not intended that the process shall be confined to a machine of any particular type, as the structure of the machine for effecting the process may be varied in innumerable ways. It is contemplated that the process may comprise a manual operation and not be confined to a machine. For instance the collector head 16 may be operated by hand substantially to effect all the purposes herein set forth and in a manner substantially an equivalent to that herein contemplated, the valve actuator 27 being operated by hand and the dagger being operated by hand to slice off the layers of bristles and to separate the layers from the main mass and in a similar manner to return it to its original position and in the manner substantially as herein set forth the different devices may be manually operated to effect the purpose specifically described with respect to the machine.

In accordance with the provisions of the patent statutes we have described the principles of operation of our invention, together with the device which we now consider to represent the best embodiment thereof; but we desire to have is understood that the device shown is only illustrative and that the invention may be carried out by other means and applied to uses other than those above set out within the scope of the claims.

We claim:

1. The process for the arrangement of fibrous material that consists in slicing a layer from one side of a collected mass of material, subjecting the layer to a fluid pressure on one side thereof to preserve its form, and then moving said layer while subjected to said pressure to a location for subsequent operations.

2. The process for the arrangement of fibrous material that consists in slicing a layer from one side of a collected mass of material, spacing the sliced layer from said mass by movement of the cutting implement, subjecting the layer to a fluid pressure on one side thereof, and then moving it while thus preserving its form to a location for subsequent operations.

3. The process for the arrangement of fibrous material that consists in projecting a sharp pointed piercing blade through a collected mass of material near one end thereof to produce a slice of said material, retaining said slice separated from said mass, subjecting the slice to a fluid pressure on one side thereof, and then removing said slice while preserving its form to a location for subsequent operations.

4. The process for the arrangement of fibrous material that consists in exerting upward pressure against a mass of fibrous material in a magazine against the resistance of a piercing blade in contact with said mass, withdrawing said blade to permit upward movement of the mass, limiting said upward movement by placing a collecting unit in its path, then piercing said mass with the blade to slice off a layer from the mass, then retaining the mass in contact with said unit, subjecting the layer to a fluid pressure on one side thereof, and then moving the latter with the mass to a location for subsequent operations thereon.

5. A machine for arranging brush fibers, said machine including means for supporting a mass of brush fibers, a collector movably mounted for application to said mass, means for creating a suction in said collector, means in said collector to receive and hold a wire thereon, means for intermittently moving said collector and for temporarily retaining it in different positions, and means longitudinally movable and rotatably mounted adjacent to said fiber supporting means to slice a layer of fibers from said mass for retention by said collector by action of the pressure therein.

6. A machine for arranging brush fibers, said machine including means for supporting a mass of brush fibers, a collector movably mounted for application to said mass, means for creating suction in said collector, means on said collector to receive and retain a plurality of wires in spaced relation thereon, means for moving said collector and for temporarily retaining it in different positions, and means longitudinally movable and rotatably mounted adjacent said fiber supporting means to slice a layer of fibers from said mass for retention by said collector by action of the pressure therein.

7. A machine for arranging brush fibers, said machine including means for supporting a mass of brush fibers, a collector movably mounted for application to said mass, means for creating suction in said collector, spring fingers on opposite sides of said collector to yieldingly receive and hold a wire therein, means for intermittently moving said collector and for temporarily retaining it in different positions, and means longitudinally movable and rotatably mounted adjacent said fiber supporting means to slice a layer of fibers from said mass for retention by said collector by action of the pressure therein.

8. A machine for arranging brush fibers, said machine including a rotatably mounted carrier connected with a source of suction, means for supporting a mass of brush fibers, a collector secured to said carrier and connected with said suction supply, means on said carrier to receive and retain a wire thereon, means for intermittently moving said collector and for temporarily retaining it in different positions, and means longitudinally movably and rotatably mounted adjacent said fiber supporting means to slice a layer of fibers from said mass for retention by said collector by action of the pressure therein.

9. A machine for collecting brush fibers, said machine including a wire supplying station, a station for supplying brush fibers, a collector movable from one of said stations to the other and having means for creating a suction therein, means on said collector to yieldingly engage a wire at the wire supplying station, means for moving said collector and for temporarily retaining it at said station, and means longitudinally movable and rotatably mounted adjacent said fiber supplying station to slice a layer of fibers from said mass for retention by said collector by action of the pressure therein.

10. A machine for arranging brush fibers, said machine including two stations for supporting wires and a fiber supplying station located therebetween, a collector from one of said stations to the other, means on said collector for yieldingly receiving and retaining wires in spaced relation thereon, means for creating a suction in said collector, and means longitudinally movable and rotatably mounted adjacent said fiber supplying means to slice a layer of fibers from said mass for retention by said collector by action of the pressure therein.

11. A machine for arranging brush fibers, said machine including means for supporting a mass of brush fibers, a collector movably mounted for application to said mass, means for creating suction in said collector, a valve for controlling said suction, means on said collector to receive and retain a wire thereon, means for intermittently moving said collector and for temporarily retaining it in different positions, means longitudinally movable and rotatably mounted adjacent said fiber supporting means to slice a layer of fibers from said mass for retention by said collector by action of the pressure therein, and means for automatically shutting off said suction at the completion of a collecting operation.

12. A machine for arranging brush fibers, said machine including a station for supporting a mass of brush fibers, stations on opposite sides of said fiber supplying station for supplying wire, a collector mounted for movement from one of said stations to each of the other stations, means for creating suction in said collector, a slicing blade longitudinally and rotatably mounted at said fiber supplying station, means for operating said blade, a valve for creating said suction, means at the fiber supplying station for automatically opening said valve, and means operative after arrival of the collector to the second station for supplying wire to automatically close said valve.

13. A machine for arranging brush fibers, said machine including a supply station for a mass of brush fibers, a wire supply station, a collector movable between said wire supply and said fiber supplying stations, a carrier vertically movable and rotatably mounted and to which said collector is secured, means for momentarily halting rotation of said collector at each of said stations, means for creating suction in said collector, means on said collector to yieldingly receive and temporarily retain a wire therein, and means longitudinally movable and rotatably mounted adjacent said fiber supplying station to slice a layer of fibers from said mass for retention by said collector by action of the pressure therein.

JAMES BYRON JONES.
ALFRED L. LE FEBVRE.